March 20, 1928.
J. TEKAVEC
1,663,322
GASOLINE AND OIL FILTER
Filed May 9, 1927
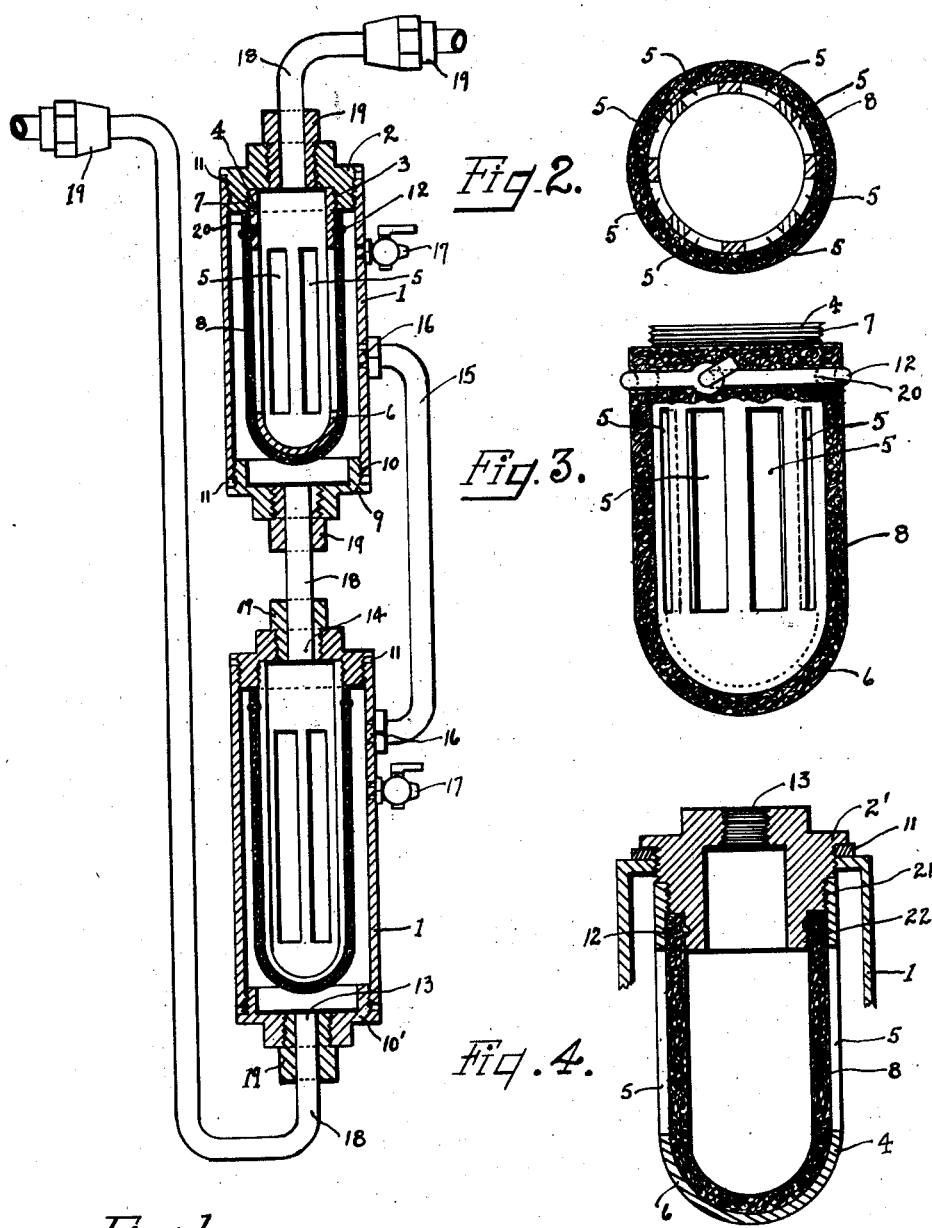
INVENTOR.
John Tekavec
BY Frank J. Lawler
ATTORNEY.

Patented Mar. 20, 1928.

1,663,322

UNITED STATES PATENT OFFICE.

JOHN TEKAVEC, OF CLEVELAND, OHIO.

GASOLINE AND OIL FILTER.

Application filed May 9, 1927. Serial No. 189,922.

My invention relates to a new and useful improvement in gasoline and oil filters and has for its general object the provision of a new and improved filter, simple in its construction, relatively cheap to make, and of extremely high efficiency and low complexity, and free from the disadvantages experienced by the filter becoming clogged with foreign matter when in use.

Another object of my invention is to provide a simple, cheap, and effective filter for removing foreign particles from gasoline as well as from oil.

Another and further object of my invention is to provide an effective means to remove water particles from the oil and gasoline.

Another and further object of my invention is to provide a simple filter the parts of which can be easily assembled or disassembled.

Another and further object of my invention is to provide a filter made of one or more units so arranged as to have a continuous process of filtering.

Another and further object of my invention is to provide a simple and effective filtering element which may be easily and quickly removed from the oil well for the purposes of cleaning or renewal.

With these objects in view, this invention consists in the combination of elements and in the details of construction hereinafter set forth and then specifically designated by the claims.

And accordingly therefore to enable those skilled in the art to which this invention appertains, to make and use the same the following description in detail by me is submitted, reference being had by numerals to the accompanying drawing which forms a part of this application, and also to the appended claims.

While the embodiment of my invention herein illustrated is that best known to me, I desire to emphasize the fact that certain changes and variations in construction may be resorted to in the practice of the invention at a future date without departing from the spirit thereof as hereinafter claimed.

In the accompanying drawings which form a part of this specification:

Figure 1 is a sectional view of the filters, showing the method of connecting same, also showing their interior construction.

Figure 2 is an enlarged cross section of the inner cylinder and the filtering element.

Figure 3 is an enlarged side view of the the inner cylinder showing the filtering element secured thereto, and on the outside of the cylinder.

Figure 4 is an enlarged side view, sectional, showing the construction of the closing cap and the filtering element secured thereto and placed on the inside of the inner cylinder.

The parts may be identified by reference numerals with which they are designated upon the drawings, and are characterized individually as now set forth.

The containers 1 shown in Figure 1 are screw-threaded on their inner upper ends to engage the closing caps. The closing caps 2 having integrally formed therein a threaded chamber 3 adapted to secure the cylinder that carries the filtering element. The cylinder 4 has a plurality of longitudinal apertures 5 and a semi-spherical closed end 6 and an exterior thread 7 at its upper end and is screwed into the under side of the closing cap, thus precluding axial displacement in the container. The filtering element 8 is mounted on the cylinder on the outside as shown in Figures 1, 2, and 3 but can be placed on the inside of the cylinder as shown in Figure 4 if desired. The lower ends of the containers may also be closed with a screw cap 9 as shown in Figure 1 at 10 or the container can be constructed with an integral end as shown in Figure 1 at 10'. The sealing means 11 is placed between the container and the caps to provide an oil and gasoline tight joint. The conduit inlet and outlet to and from the container, the inlet 13 and the outlet 14 are diametrically opposite. The container is also provided with an auxiliary by-pass 15, the orifices 16; 16 for the by-pass conduit are formed in the container walls and at right angles to the axis of the container. The containers are provided with test cocks 17; 17; having their orifices formed in the container walls, their object being to provide means to test the oil flow in the containers. The conduits 18; 18; 18; 18; are secured to the caps and the container by standard couplings, 19; 19; 19; 19; 19; 19. The cylinder is provided with an annular groove 20 that coacts with the securing means to detachably secure the filtering element when the securing means is fastened around the filtering element, as shown in Figure 3.

In Figure 4 the closing cap 2' is provided with a reduced threaded integral section 21 and an integral reduced section 22 adapted to coact with the securing means to secure the filtering element to the cap. When this style of closing cap is used the filtering element is placed on the inside of the cylinder.

From the foregoing description the operation of my improved oil and gasoline filter is as follows:—

When the oil and gasoline filter is used as an oil filter the unit may be placed anywhere in the oil line, the preferable position being adjacent the engine block. When placed in this line the oil will have to pass through the filter consisting of either one or more units, depending entirely on how many is used and then will be forced into the engine free from all impurities. It is understood in the art of course that the oil that enters the engine is always under pressure, approximately twenty pounds, and so if an oil filter is placed in the oil line it necessarily follows that the oil in the filter will also be under pressure and that this pressure will be the same as before. Therefore it is necessary to have all parts that are used in its manufacture heavy enough and strong enough to withstand this pressure. Now if two units of the filter are used coupled together the action will be as follows—the oil enters the first unit at the connection to the oil line, from this point it travels under pressure into the oil container located on the inside of the oil container is a hollow cylinder having around or in it the filtering element. Now since the oil in the oil container is under pressure the oil is slowly forced through the filtering element into the hollow cylinder from whence it flows under pressure to the next unit (if one is used) through the connecting conduit. As above this unit being an exact duplicate of the first unit the oil in the oil container surrounds the filtering element on the hollow cylinder and is slowly forced through this filtering element into the hollow cylinder from whence it flows along the oil line into the engine relieved of all its foreign matter and its water content. I also, when two or more units are used in an oil line have another small connecting conduit connecting the two oil containers together as shown in the drawing. The purpose of this other connecting conduit is to allow the oil in the first oil container, when this oil container becomes filled, to flow over to and into the second unit of the filter so that filtering can also be carried on there. The oil after filtering in the first unit travels to the second unit and is again filtered thus making a double filtration of the first oil. At all times the oil is being filtered in all the units so that pure filtered oil enters the engine block. It will be understood that the more the oil is filtered the purer it becomes so that two or more units may be used to accomplish this result. It is my wish however to have it understood in the art that satisfactory filtration of the oil is accomplished by one unit.

Again if only one unit of the filter is used the action will be the same except that in this case the oil is only filtered once. If more than one unit is used then the action will be as set out above for the two units. In short the action in every case is that the oil is forced into the unit then through the filter into the hollow cylinder, then still under pressure it feeds to the engine through the oil line connection.

When used as a gasoline filter it is placed in the gasoline line close to the vacuum tank. It is a well known fact that gasoline does have water particles in it, also parts of lint, dirt and such like and when the gasoline is forced through the unit as described above for the oil then the same filtering action goes on and clean gasoline then flows through to the carburetter and thence into the explosive chamber of the engine. By having the gasoline cleaned and filtered, the carburetter action is better with the result that the "firing" is better, the final result being that one gets more power out of the engine. By having the oil filtered one also gets more power out of the engine, so that when the oil and the gasoline are both filtered the engine horsepower is greatly increased, starting of the engine is made easier with the final result that the life of the engine is increased.

Again in using this filtering device, I have it so designed and arranged that the filtering material can be placed either on the outside of the inner cylinder of the unit, or on the inside of the inner cylinder of the unit. It will therefore be readily seen that with these arrangements the unit can be connected into the oil line so that the oil or gasoline is filtered from the inside of the filtering bag out into the oil well of the first unit, thence into the second unit where again from the connection this first filtered oil can be filtered from the inside of the bag out into the oil well and thence to the oil line and thence to the engine, or the unit can be connected into the oil line so that the oil is filtered from the outside of the filtering bag into the inner tube thence into the second unit where again the oil is filtered from the outside of the filtering bag into the inner tube and thence to the oil line and into the engine. Again, it can be arranged so that it filters from the inside of the bag in the first unit into the second unit where it is filtered from the outside of the filtering bag into the inner tube and from there into the oil line thence to the engine. Again, the connections can be arranged to filter from the outside of the bag in the first unit then into the second unit where it can be filtered from the inside of the filtering bag out into the oil well of the unit and thence to the oil line and into the engine.

Again, an automobile engine running at an average speed circulates the oil in the crank-case about one hundred to one hundred and fifty times each hour. It is also a well known fact that dirt and sludge consisting of finely divided particles find their way into the oil, also into the gasoline and besides these fine particles of iron, dust, brass, steel and aluminum, hard carbon and other grit from the road dust cause excessive wear of the cylinders, pistons and bearings. My filter is designed to remove this dirt, sludge and metal particles and other foreign particles from the oil. It is also designed to remove dirt and rust from the gasoline when used as a gasoline filter. Even though the oil is frequently changed it becomes contaminated almost immediately unless the oil filter is used, and it is only by continuous filtration that the oil can be kept free from dust, thereby eliminating frequent oil changing, excessive engine wear as well as minimizing repair bills. The filtering element is preferably made of felt.

While therefore in the foregoing there has been illustrated in the drawing and described in the specification such combination and arrangement of elements as constitute the preferred construction or embodiment of this invention, it is nevertheless desired to emphasize the fact that interpretation of the invention should only be conclusive when made in the light of the subjoined claims.

What I claim is:

1. The combination of a container having a testing cock and an auxiliary by-pass on its outer surface, a lower cap screw threadedly engaging the container, a closing cap detachably secured to the container and having a threaded socket integrally formed therein, a cylinder having a plurality of longitudinal apertures and a semi-spherical closed end, said cylinder screw threadedly engaging the closing cap, a filtering element externally engaging the cylinder, holding means for securing the filtering element to the cylinder and sealing means positioned between each cap and the container.

2. The combination of a container having an auxiliary by-pass on its outer surface, a closing cap detachably secured to the container and having a socket integrally formed therein, a cylinder having a plurality of longitudinal apertures and a closed end, said cylinder engaging the closing cap, a filtering element engaging the cylinder, means for securing the filtering element to the cylinder and sealing means positioned between the closing cap and the container.

3. The combination of a container having a testing cock on its outer surface, a closing cap detachably secured to the container and having a socket integrally formed therein, a cylinder having longitudinal apertures and an open end, said cylinder secured to the closing cap, a filtering element detachably secured to the cylinder, securing means for securing the filtering element to the cylinder and sealing means positioned between the closing cap and the container.

4. The combination of a container having a lower cap screw threadedly engaging the container, a closing cap screw threadedly engaging the container and having integrally formed therewith a stepped threaded periphery, said closing cap also having formed therein an integral socket, a cylinder having a plurality of longitudinal apertures and a closed end, said cylinder screw threadedly engaging the closing cap, a filtering element externally engaging the cylinder, securing means for securing the filtering element to the cylinder, and sealing means between the lower cap and the container and also between the closing cap and the container.

5. The combination of a container having a closing cap detachably secured to the container and having a socket integrally formed therein, a cylinder having a plurality of longitudinal apertures and a closed end also having an annular groove adjacent its upper end, said cylinder secured to the closing cap, a filtering element detachably secured to the cylinder externally, securing means for securing the filtering element to the cylinder and sealing means between the closing cap and the container.

JOHN TEKAVEC.